(12) United States Patent
Hustad et al.

(10) Patent No.: US 8,907,034 B2
(45) Date of Patent: Dec. 9, 2014

(54) COMB ARCHITECTURE OLEFIN BLOCK COPOLYMERS

(75) Inventors: Phillip D. Hustad, Manvel, TX (US); Endre Szuromi, Richwood, TX (US); Francis J. Timmers, Midland, MI (US); Edmund M. Carnahan, Pearland, TX (US); Thomas P. Clark, Midland, MI (US); Gordon R. Roof, Midland, MI (US); Sara B. Klamo, Houston, TX (US); Daniel J. Arriola, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 621 days.

(21) Appl. No.: 13/228,892

(22) Filed: Sep. 9, 2011

(65) Prior Publication Data

US 2012/0083575 A1    Apr. 5, 2012

Related U.S. Application Data (60) Provisional application No. 61/388,191, filed on Sep. 30, 2010.

(51) Int. Cl.
| | | |
|---|---|---|
| *C08F 293/00* | (2006.01) | |
| *C08F 4/52* | (2006.01) | |
| *C08F 4/50* | (2006.01) | |
| *C08F 4/76* | (2006.01) | |
| *C08F 4/00* | (2006.01) | |
| *C08F 210/16* | (2006.01) | |
| *C08F 297/08* | (2006.01) | |

(52) U.S. Cl.
CPC ............. *C08F 210/16* (2013.01); *C08F 297/08* (2013.01); *C08F 2410/01* (2013.01); *C08F 2410/04* (2013.01)
USPC ........... 526/348; 525/245; 502/150; 502/152; 502/155; 502/171

(58) Field of Classification Search
USPC ................. 525/245; 502/150, 152, 155, 171; 526/348
See application file for complete search history.

(56) References Cited

U.S. PATENT DOCUMENTS 7,795,321 B2 *  9/2010  Cheung et al. ................ 521/142
7,858,707 B2 * 12/2010  Arriola et al. ................. 525/245

OTHER PUBLICATIONS

Eric J. Markel, et al, Metallocene-Based Branch-Block Thermoplastic Elastomers, Macromolecules, 2000, 33 (23), 8541-8548.
Armenag H. Dekmezian, et al, Characterization and Modeling of Metallocene-Based Branch-Block Copolymers, Macromolecules, 2002, 35 (25), 9586-9594.

* cited by examiner

*Primary Examiner* — Ling Choi
*Assistant Examiner* — Chun-Cheng Wang (57) ABSTRACT

Embodiments of the invention provide a comb architecture olefin block copolymer, a method of making the comb olefin block copolymer and blends comprising the comb olefin block copolymer.

5 Claims, 4 Drawing Sheets

COMB ARCHITECTURE OLEFIN BLOCK COPOLYMERS

CROSS REFERENCE TO RELATED APPLICATIONS

This application claims priority to U.S. Provisional Application Ser. No. 61/388,191 filed on Sep. 30, 2010, the contents of which are herein incorporated by reference in their entirety for the purpose of US patent practice.

FIELD OF THE INVENTION

This invention relates to comb architecture olefin block copolymers.

BACKGROUND OF THE INVENTION

Olefin Block Copolymers (OBC) can exhibit a unique balance of flexibility-heat resistance-recovery properties. In particular, the high temperature compression set properties of OBCs with ethylene crystallinity are comparable to or exceed those of the incumbent materials such as f-PVC and SEBS for profile and gasket applications. However, it would be desirable to improve the rheology of these polymers for melt processability of extruded profiles, gaskets, foams etc. Several options have been explored to improve melt rheological behavior of OBCs to allow improved use in extruded profile applications, such as peroxide modification and E-beam crosslinking, such as described in U.S. Pat. No. 7,795,321. Branching of OBCs has been disclosed in US Patent Application Publication No. 2009/0163667.

Comb polymers, in general, have been previously described in, for example, "Metallocene-Based Branch-Block Thermoplastic Elastomers" Eric J. Markel, et al, *Macromolecules,* 2000, 33 (23), 8541-8548, "Characterization and Modeling of Metallocene-Based Branch-Block Copolymers" Armenag H. Dekmezian, et al, *Macromolecules,* 2002, 35 (25), 9586-9594, U.S. Pat. No. 6,423,793, U.S. Pat. No. 6,147,180, and U.S. Pat. No. 6,444,773.

It would be advantageous to provide comb architecture olefin block copolymers (C-OBCs) with improved properties.

SUMMARY OF THE INVENTION

According to the present invention there is now provided a composition for use in the polymerization of an addition polymerizable monomer, preferably two or more addition polymerizable monomers, especially ethylene and at least one copolymerizable comonomer, to form a segmented copolymer (multi-block copolymer) having a comb architecture, said copolymer containing therein two or more, preferably three or more segments or blocks differing in one or more chemical or physical properties as further disclosed herein, the composition comprising the admixture or reaction product resulting from combining:
(A) a first olefin polymerization catalyst, Catalyst A, having a high comonomer incorporation index and characterized as poor shuttling in the inventive process,
(B) a second olefin polymerization catalyst, Catalyst B, having a low comonomer incorporation index and characterized as good shuttling in the inventive process, and
(C) a chain shuttling agent containing vinyl unsaturation.

In another embodiment of the invention, there is provided a method for selecting an admixture of catalysts (A) and (B) and chain shuttling agent (C) capable of producing multi-block copolymers according to the invention, especially such copolymers comprising ethylene in polymerized form.

In a further embodiment of the present invention there is provided a process for preparing a comb architecture olefin block copolymer, especially such copolymer comprising ethylene and optionally one or more addition polymerizable monomers other than ethylene, said process comprising contacting ethylene and optionally one or more addition polymerizable monomers other than ethylene under addition polymerization conditions with a composition comprising:
the admixture or reaction product resulting from combining:
(A) a first olefin polymerization catalyst, Catalyst A, having a high comonomer incorporation index and characterized as poor shuttling in the inventive process,
(B) a second olefin polymerization catalyst, Catalyst B, having a low comonomer incorporation index and characterized as good shuttling in the inventive process, and
(C) a chain shuttling agent containing vinyl unsaturation.

Preferably, the foregoing process takes the form of a continuous solution process for forming comb block copolymers, comprising a soft backbone and hard or crystalline side chains, using multiple catalysts that are incapable of interconversion. That is the catalysts are chemically distinct. Under continuous solution polymerization conditions, the process is ideally suited for polymerization of mixtures of monomers at high monomer conversions. Under these polymerization conditions, shuttling from the chain shuttling agent to Catalyst B becomes advantaged compared to chain growth, and comb block copolymers according to the invention are formed in high efficiency. The length of the backbone and crystalline side chains may be controlled independently.

In another embodiment of the invention, comb olefin block copolymers are formed having soft backbones and hard or crystalline side chains, preferably by the process comprising contacting ethylene and optionally one or more addition polymerizable monomers other than ethylene under addition polymerization conditions with a composition comprising:
the admixture or reaction product resulting from combining:
(A) a first olefin polymerization catalyst, Catalyst A, having a high comonomer incorporation index and characterized as poor shuttling in the inventive process,
(B) a second olefin polymerization catalyst, Catalyst B, having a low comonomer incorporation index and characterized as good shuttling in the inventive process, and (C) a chain shuttling agent containing vinyl unsaturation.

In yet another embodiment of the invention, there are provided functionalized derivatives of the foregoing comb block copolymers.

In a still further embodiment of the present invention, there is provided a polymer mixture comprising: (1) an organic or inorganic polymer, preferably a homopolymer of ethylene or of propylene and/or a copolymer of ethylene or propylene and a copolymerizable comonomer, and (2) a comb block copolymer according to the present invention or prepared according to the process of the present invention. In a desirable embodiment component (1) is a matrix polymer comprising high density polyethylene or isotactic polypropylene and component (2) is an elastomeric comb block copolymer. In a preferred embodiment, component (2) comprises occlusions of the matrix polymer formed during compounding of components (1) and (2).

DESCRIPTION OF EMBODIMENTS OF THE INVENTION

Definitions

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

New comb OBC (C-OBC) architectures have been found that have very high rheology ratios compared to long-chain branched OBCs. These materials have a predominate structure featuring a soft copolymer backbone and hard side chains. The materials are prepared using a combination of a good shuttling poor incorporator catalyst, a poor shuttling good incorporator catalyst, and a vinyl-containing chain shuttling agent. The inventive C-OBCs show general characteristics of OBCs and also have very high rheology ratios that may facilitate their use in extruded profile applications.

The term "polymer", includes both conventional homopolymers, that is, homogeneous polymers prepared from a single monomer, and copolymers (interchangeably referred to herein as interpolymers), meaning polymers prepared by reaction of at least two monomers or otherwise containing chemically differentiated segments or blocks therein even if formed from a single monomer. More specifically, the term "polyethylene" includes homopolymers of ethylene and copolymers of ethylene and one or more $C_{3-8}$ α-olefins in which ethylene comprises at least 50 mole percent. The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. Compared to block copolymers of the prior art, including copolymers produced by sequential monomer addition, fluxional catalysts, or anionic polymerization techniques, the copolymers of the invention are characterized by unique distributions of both polymer polydispersity (PDI or Mw/Mn), block length distribution, and/or block number distribution, due, in a preferred embodiment, to the effect of the shuttling agent(s) in combination with multiple catalysts. More specifically, when produced in a continuous process, the polymers desirably possess PDI from 1.7 to 3.9, preferably from 1.8 to 2.5, more preferably from 1.8 to 2.2, and most preferably from 1.8 to 2.1. When produced in a batch or semi-batch process, the polymers desirably possess PDI from 1.0 to 2.9, preferably from 1.3 to 2.5, more preferably from 1.4 to 2.0, and most preferably from 1.4 to 1.8.

The term "ethylene multi-block copolymer" means a multi-block copolymer comprising ethylene and one or more copolymerizable comonomers, wherein ethylene comprises a plurality of the polymerized monomer units of at least one block or segment in the polymer, preferably at least 90 mole percent, more preferably at least 95 mole percent, and most preferably at least 98 mole percent of said block. Based on total polymer weight, the ethylene multi-block copolymers of the present invention preferably have an ethylene content from 25 to 97 percent, more preferably from 40 to 96 percent, even more preferably from 55 to 95 percent, and most preferably from 65 to 85 percent.

Because the respective distinguishable segments or blocks formed from two of more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In a preferred embodiment the quantity of extractable polymer using either a dialkyl ether- or an alkane-solvent is less than 10 percent, preferably less than 7 percent, more preferably less than 5 percent and most preferably less than 2 percent of the total polymer weight.

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "comb architecture" means generally, having an identifiable backbone or central polymer chain containing multiple branching points. The branches may be linear or further branched as well.

A catalyst is a "good shuttler" with a given chain shuttling agent when the catalyst exhibits substantial reversible chain transfer with the chain shuttling agent during chain growth with the appropriate monomer mixture. A method for identifying a good shuttler was disclosed in WO2005/090427 and is reproduced in part below:

I. One or more addition polymerizable, preferably olefin monomers are polymerized using a mixture comprising a potential catalyst and a potential chain shuttling agent. This polymerization test is desirably performed using a batch or semi-batch reactor (that is, without resupply of catalyst or shuttling agent), preferably with relatively constant monomer concentration, operating under solution polymerization conditions, typically using a molar ratio of catalyst to chain shuttling agent from 1:5 to 1:500. After forming a suitable quantity of polymer, the reaction is terminated by addition of a catalyst poison and the polymer's properties (Mw, Mn, and Mw/Mn or PDI) measured.

II. The foregoing polymerization and polymer testing are repeated for several different reaction times, providing a series of polymers having a range of yields and PDI values.

III. Catalyst/shuttling agent pairs demonstrating significant reversible polymer transfer both to and from the shuttling agent are characterized by a polymer series wherein the minimum PDI is less than 2.0, more preferably less than 1.5, and most preferably less than 1.3. Furthermore, if chain shuttling is occurring, the Mn of the polymer will increase, preferably nearly linearly, as conversion is increased. Most preferred catalyst/shuttling agent pairs are those giving polymer Mn as a function of conversion (or polymer yield) fitting a line with a statistical precision ($R^2$) of greater than 0.95, preferably greater than 0.99.

A catalyst is a "poor shuttler" with a given chain shuttling agent when the catalyst and shuttling agent pair fails the above test. More specifically, the catalyst makes polymer with an unchanged or increased MWD in the presence of the potential chain shuttling agent compared to polymer made in the absence of the shutting agent, and/or the molecular weight of the polymer is unchanged or reduced with increasing conversion.

"Good shuttling" and "poor shuttling" is also described in "An Exploration of the Effects of Reversibility in Chain Transfer to Metal in Olefin Polymerization", Phillip D. Hustad, Roger L. Kuhlman, Edmund M. Carnahan, Timothy T. Wenzel, and Daniel J. Arriola, Macromolecules, 2008, 41 (12), 4081-4089.

The term "soft backbone" means that the backbone comprises a soft copolymer comprising ethylene and an α-olefin, having an α-olefin content greater than 30 mole %, greater than 35 mole %, greater than 40 mole %, greater than 45 mole % or greater than 55 mole %. In one embodiment, the soft backbone has an α-olefin content greater than 55 mole %. The backbone can have an α-olefin content of from 30 mole % to 90 mol %, from 35 mol % to 90 mol %, from 40 mole % to 85 mol % or from 55 mol % to 80 mol %. The comonomer content (content of monomers other than ethylene) may also be greater than about 5 weight percent, preferably greater than about 8 weight percent, greater than about 10 weight percent, or greater than about 15 weight percent based on the weight of the polymer. In some embodiments, the comonomer content in the soft backbone can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent. The comonomer content may be from greater than 5 wt % up to 90 wt %, from 10 wt % to 80 wt %, from 15 wt % to 70 wt %, from 20 wt % to 60 wt % or from 25 wt % to 50 wt %, based on the weight of the polymer.

The term "hard or crystalline side chains" refers to blocks of polymerized units in which ethylene is present in an amount greater than about 95 weight percent, and preferably greater than about 98 weight percent based on the weight of the polymer. In other words, the comonomer content (content of monomers other than ethylene) in the hard side chains is less than about 5 weight percent, and preferably less than about 2 weight percent based on the weight of the polymer. In some embodiments, the hard side chains comprise all or substantially all ethylene. The crystalline side chains may be present in amount of from 5 wt % to 50 wt % of the polymer, preferably from 10 wt % to 35 wt %, more preferably from 15 wt % to 30 wt %.

The term, "comonomer incorporation index", refers to the percent comonomer incorporated into a copolymer prepared under representative ethylene/comonomer polymerization conditions by the catalyst under consideration in the absence of other polymerization catalysts, ideally under steady-state, continuous solution polymerization conditions in a hydrocarbon diluent at 100° C., 4.5 MPa ethylene pressure (reactor pressure), greater than 92 (more preferably greater than 95) percent ethylene conversion, and greater than 0.01 percent comonomer conversion. The selection of metal complexes or catalyst compositions having the greatest difference in comonomer incorporation indices results in copolymers from two or more monomers having the largest difference in block or segment properties, such as density. Comonomer incorporation index may be determined by various techniques such as those disclosed in WO2005/090427 A1 on page 14, line 25 through page 16, line 24, which is also hereby incorporated by reference for the purposes of US patent practice. The polymers of the invention are prepared using a "good incorporating" catalyst with mole percent of the copolymer resulting from the comonomer incorporation index test (F1) and a "poor incorporating" catalyst with mole percent of the copolymer resulting from the comonomer incorporation index test (F2) such that comonomer incorporation index ratio (F1/F2) is 2 or more, preferably 4 or more, more preferably 10 or more, still more preferably 15 or more, and most preferably 20 or more. In other words, F1/F2≥2, preferably F1/F2≥4, more preferably F1/F2≥10, still more preferably F1/F2≥15 and most preferably F1/F2≥20.

As used herein the term "aromatic" refers to a polyatomic, cyclic, conjugated ring system containing (4δ+2) π-electrons, wherein δ is an integer greater than or equal to 1. The term "fused" as used herein with respect to a ring system containing two or more polyatomic, cyclic rings means that with respect to at least two rings thereof, at least one pair of adjacent atoms is included in both rings. The term "aryl" refers to a monovalent aromatic substituent which may be a single aromatic ring or multiple aromatic rings which are fused together, linked covalently, or linked to a common group such as a methylene or ethylene moiety. Examples of aromatic ring(s) include phenyl, naphthyl, anthracenyl, and biphenyl, among others.

"Substituted aryl" refers to an aryl group in which one or more hydrogen atoms bound to any carbon is replaced by one or more functional groups such as alkyl, substituted alkyl, cycloalkyl, substituted cycloalkyl, heterocycloalkyl, substituted heterocycloalkyl, halogen, alkylhalos (e.g., $CF_3$), hydroxy, amino, phosphido, alkoxy, amino, thio, nitro, and both saturated and unsaturated cyclic hydrocarbons which are fused to the aromatic ring(s), linked covalently or linked to a common group such as a methylene or ethylene moiety. The common linking group may also be a carbonyl as in benzophenone or oxygen as in diphenylether or nitrogen in diphenylamine.

Monomers

Suitable monomers for use in preparing the polymers of the present invention include ethylene and one or more addition polymerizable monomers other than ethylene. Examples of suitable comonomers include straight-chain or branched α-olefins of 3 to 30, preferably 3 to 20 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cycloolefins of 3 to 30, preferably 3 to 20 carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene, and 5,9-dimethyl-1,4,8-decatriene; aromatic vinyl compounds such as mono or poly alkylstyrenes (including styrene, o-methylstyrene, m-methylstyrene, p-methylstyrene, o,p-dimethylstyrene, o-ethylstyrene, m-ethylstyrene and p-ethylstyrene), and functional group-containing derivatives, such as methoxystyrene, ethoxystyrene, vinylbenzoic acid, methyl vinylbenzoate, vinylbenzyl acetate, hydroxystyrene, o-chlorostyrene, p-chlorostyrene, divinylbenzene, 3-phenylpropene, 4-phenylpropene, α-methylstyrene, vinylchloride, 1,2-difluoroethylene, 1,2-dichloroethylene, tetrafluoroethylene, and 3,3,3-trifluoro-1-propene.

Chain Shuttling Agents

The term, "shuttling agent" refers to a compound or mixture of compounds employed in the composition of the present invention that is capable of causing polymeryl exchange between at least two active catalyst sites of the catalysts included in the composition under the conditions of the polymerization. That is, transfer of a polymer fragment occurs both to and from one or more of the active catalyst sites. In contrast to a shuttling agent, a "chain transfer agent" causes termination of polymer chain growth and amounts to a one-time transfer of growing polymer from the catalyst to the transfer agent. Preferably, the shuttling agent has an activity ratio $R_{A-B}/R_{B-A}$ of from 0.01 and 100, more preferably from 0.1 to 10, most preferably from 0.5 to 2.0, and most highly preferably from 0.8 to 1.2, wherein $R_{A-B}$ is the rate of polymeryl transfer from catalyst A active site to catalyst B active site via the shuttling agent, and $R_{B-A}$ is the rate of reverse polymeryl transfer, i.e., the rate of exchange starting from the catalyst B active site to catalyst A active site via the shuttling agent. Desirably, the intermediate formed between the shuttling agent and the polymeryl chain is sufficiently stable that chain termination is relatively rare. Desirably, less than 90 percent, preferably less than 75 percent, more preferably less than 50 percent and most desirably less than 10 percent of shuttle-polymeryl products are terminated prior to attaining 3 distinguishable polymer segments or blocks. Ideally, the rate of chain shuttling (defined by the time required to transfer a polymer chain from a catalyst site to the chain shuttling agent and then back to a catalyst site) is equivalent to or faster than the rate of polymer termination, even up to 10 or even 100 times faster than the rate of polymer termination. This permits polymer block formation on the same time scale as polymer propagation.

By selecting different combinations of catalysts having differing comonomer incorporation rates as well as differing reactivities, and by pairing various shuttling agents or mixtures of agents with these catalyst combinations, polymer products having segments of different densities or comonomer concentrations, different block lengths, and different numbers of such segments or blocks in each copolymer can be prepared. For example, if the activity of the shuttling agent is low relative to the catalyst polymer chain propagation rate of one or more of the catalysts, longer block length multi-block copolymers and polymer blends may be obtained. Contrariwise, if shuttling is very fast relative to polymer chain propagation, a copolymer having a more random chain structure and shorter block lengths is obtained. An extremely fast shuttling agent may produce a multi-block copolymer having substantially random copolymer properties. By proper selection of both catalyst mixture and shuttling agent, relatively pure block copolymers, copolymers containing relatively large polymer segments or blocks, and/or blends of the foregoing with various ethylene homopolymers and/or copolymers can be obtained.

Suitable shuttling agents include compounds or complexes comprising ethylenic unsaturation such as vinyl groups, including polyvinyl groups, such as conjugated or non-conjugated diene or divinylphenylene functionality. Suitable shuttling agents include but are not limited to: vinylmethylzinc, (2-propene-1-yl)methylzinc, (2-buten-2-yl)methylzinc, (2-buten-3-yl)methylzinc, (3-buten-1-yl)methylzinc, (1-butene-2-yl)methylzinc, (1,3-butadiene-1-yl)methylzinc, 1,4-diphenyl-(1,2,3,4-$\eta^4$-1,3-butadiene)benzylzinc, di(3-buten-1-yl)zinc, (p-vinylbenzyl)methyl zinc, (7-octenyl)methylzinc, di(7-octenyl)zinc, diallylzinc, (vinyl)ethylzinc, (p-vinylbenzyl)ethylzinc, (vinyl)1-dodecylzinc, (2-propen-1-yl)(trimethylsilylmethyl)zinc, (1,4-butylene)di((2-propen-1-yl)zinc), 5-hexenylzincbromide, (2-propen-1-yl)dimethylaluminum, di(2-propen-1-yl)aluminumbromide, di(5-hexenyl)zinc, 5-hexenylethylzinc, and (5-hexenyl)t-butylzinc.

Process

Preferably, the inventive process takes the form of a continuous solution process for forming block copolymers, especially multi-block copolymers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers according to the invention are formed in high efficiency. Preferably, the process is performed in a single reactor.

Catalysts

Suitable catalysts for use herein include any compound or combination of compounds that is adapted for preparing polymers of the desired composition or type. Both heterogeneous and homogeneous catalysts may be employed. Examples of heterogeneous catalysts include the well known Ziegler-Natta compositions, especially Group 4 metal halides supported on Group 2 metal halides or mixed halides and alkoxides and the well known chromium or vanadium based catalysts. Preferably however, for ease of use, the catalysts for use herein are homogeneous catalysts comprising a relatively pure organometallic compound or metal complex, especially compounds or complexes based on metals selected from Groups 3-10 or the Lanthanide series of the Periodic Table of the Elements. It is preferred that any catalyst employed herein, not significantly detrimentally affect the performance of the other catalyst under the conditions of the present polymerization. Desirably, no catalyst is reduced in activity by greater than 25 percent, more preferably greater than 10 percent under the conditions of the present polymerization.

Metal complexes for use herein having high comonomer incorporation index (Catalyst A) include complexes of transition metals selected from Groups 3 to 15 of the Periodic Table of the Elements containing one or more delocalized, π-bonded ligands or polyvalent Lewis base ligands. Examples include metallocene, half-metallocene, constrained geometry, and polyvalent pyridylamine, or other polychelating base complexes. The complexes are generically depicted by the formula: $MK_kX_xZ_z$, or a dimer thereof, wherein M is a metal selected from Groups 3-15, preferably 3-10, more preferably 4-8, and most preferably Group 4 of the Periodic Table of the Elements;

K independently each occurrence is a group containing delocalized π-electrons or one or more electron pairs through which K is bound to M, said K group containing up to 50 atoms not counting hydrogen atoms, optionally two or more K groups may be joined together forming a bridged structure, and further optionally one or more K groups may be bound to Z, to X or to both Z and X;

X independently each occurrence is a monovalent, anionic moiety having up to 40 non-hydrogen atoms, optionally one or more X groups may be bonded together thereby forming a divalent or polyvalent anionic group, and, further optionally, one or more X groups and one or more Z groups may be bonded together thereby forming a moiety that is both covalently bound to M and coordinated thereto;

Z independently each occurrence is a neutral, Lewis base donor ligand of up to 50 non-hydrogen atoms containing at least one unshared electron pair through which Z is coordinated to M;

k is an integer from 0 to 3;

x is an integer from 1 to 4;

z is a number from 0 to 3; and the sum, k+x, is equal to the formal oxidation state of M.

Additional suitable catalysts are those disclosed in US Patent Application Publication No. 2009/0163667 paragraph [0089] to paragraph [0407], herein incorporated by reference for purposes of US patent practice.

Preferred metal complexes of polyvalent Lewis bases for use as Catalyst A herein include compounds corresponding to the formula:

where:

$R^{20}$ is an aromatic or inertly substituted aromatic group containing from 5 to 20 atoms not counting hydrogen, or a polyvalent derivative thereof;

$T^3$ is a hydrocarbylene or silane group having from 1 to 20 atoms not counting hydrogen, or an inertly substituted derivative thereof;

$M^3$ is a Group 4 metal, preferably zirconium;

G is an anionic, neutral or dianionic ligand group; preferably a halide, hydrocarbyl or dihydrocarbylamide group having up to 20 atoms not counting hydrogen;

g is a number from 1 to 5 indicating the number of such G groups; and bonds and electron donative interactions are represented by lines and arrows respectively.

Preferably, such complexes correspond to the formula:

wherein:

$T^3$ is a divalent bridging group of from 2 to 20 atoms not counting hydrogen, preferably a substituted or unsubstituted, $C_{3-6}$ alkylene group; and $Ar^2$ independently each occurrence is an arylene or an alkyl- or aryl-substituted arylene group of from 6 to 20 atoms not counting hydrogen;

$M^3$ is a Group 4 metal, preferably zirconium;

G independently each occurrence is an anionic, neutral or dianionic ligand group;

g is a number from 1 to 5 indicating the number of such X groups; and electron donative interactions are represented by arrows.

Preferred examples of metal complexes of foregoing formula include the following compounds:

where $M^3$ is Zr;

$Ar^4$ is $C_{6-20}$ aryl or inertly substituted derivatives thereof, especially 3,5-di(isopropyl)phenyl, 3,5-di(isobutyl)phenyl, dibenzo-1H-pyrrole-1-yl, or anthracen-5-yl, and $T^4$ independently each occurrence comprises a $C_{3-6}$ alkylene group, a $C_{3-6}$ cycloalkylene group, or an inertly substituted derivative thereof;

$R^{21}$ independently each occurrence is hydrogen, halo, hydrocarbyl, trihydrocarbylsilyl, or trihydrocarbylsilylhydrocarbyl of up to 50 atoms not counting hydrogen; and G, independently each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups. Particularly preferred is the following metal complex:

[2',2'''-((1R,2R)-cyclohexane-1,2-diylbis(methylene))bis(oxy))bis(3-(9H-carbazol-9-yl)-5-methyl-[1,1'-biphenyl]-2-ol]zirconium dimethyl, Catalyst 1

Preferred metal compounds having a low comonomer incorporation index (Catalyst B) include Group 4-10 metal derivatives corresponding to the formula:

wherein $M^2$ is a metal of Groups 4-10 of the Periodic Table of the elements, preferably Group 4 metals, Ni(II) or Pd(II), most preferably zirconium;

$T^2$ is a nitrogen, oxygen or phosphorus containing group;

$X^2$ is halo, hydrocarbyl, or hydrocarbyloxy;

t is one or two;

x'' is a number selected to provide charge balance;

and $T^2$ and N are linked by a bridging ligand.

Such catalysts have been previously disclosed in *J. Am. Chem. Soc.*, 118, 267-268 (1996), *J. Am. Chem. Soc.*, 117, 6414-6415 (1995), and *Organometallics*, 16, 1514-1516, (1997), among other disclosures.

Preferred examples of the foregoing metal complexes are aromatic diimine or aromatic dioxyimine complexes of Group 4 metals, especially zirconium, corresponding to the formula:

wherein;

$M^2$, $X^2$ and $T^2$ are as previously defined;

$R^d$ independently each occurrence is hydrogen, halogen, or $R^e$; and $R^e$ independently each occurrence is $C_{1-20}$ hydrocarbyl or a heteroatom-, especially a F, N, S or P-substituted derivative thereof, more preferably $C_{1-10}$ hydrocarbyl or a F or N substituted derivative thereof, most preferably alkyl, dialkylaminoalkyl, pyrrolyl, piperidenyl, perfluorophenyl, cycloalkyl, (poly)alkylaryl, or aralkyl.

Most preferred examples of the foregoing metal complexes are aromatic dioxyimine complexes of zirconium, corresponding to the formula:

wherein;

$X^2$ is as previously defined, preferably $C_{1-10}$ hydrocarbyl, most preferably methyl or benzyl; and $R^e$, is methyl, isopropyl, t-butyl, cyclopentyl, cyclohexyl, 2-methylcyclohexyl, 2,4-dimethylcyclohexyl, 2-pyrrolyl, N-methyl-2-pyrrolyl, 2-piperidenyl, N-methyl-2-piperidenyl, benzyl, o-tolyl, 2,6-dimethylphenyl, perfluorophenyl, 2,6-di(isopropyl)phenyl, or 2,4,6-trimethylphenyl.

The foregoing complexes also include certain phosphinimine complexes are disclosed in EP-A-890581. These complexes correspond to the formula: $[(R^f)_3—P=N]_fM(K^2)(R^f)_{3-f}$ wherein:

$R^f$ is a monovalent ligand or two $R^f$ groups together are a divalent ligand, preferably $R^f$ is hydrogen or $C_{1-4}$ alkyl;

M is a Group 4 metal, $K^2$ is a group containing delocalized π-electrons through which $K^2$ is bound to M, said $K^2$ group containing up to 50 atoms not counting hydrogen atoms, and f is 1 or 2.

Particularly preferred is bis-(1-(2-methylcyclohexyl)ethyl)(2-oxoyl-3,5-di(t-butyl)phenyl)immino)zirconium dimethyl, Catalyst 2.

Polymers

Figure 1:
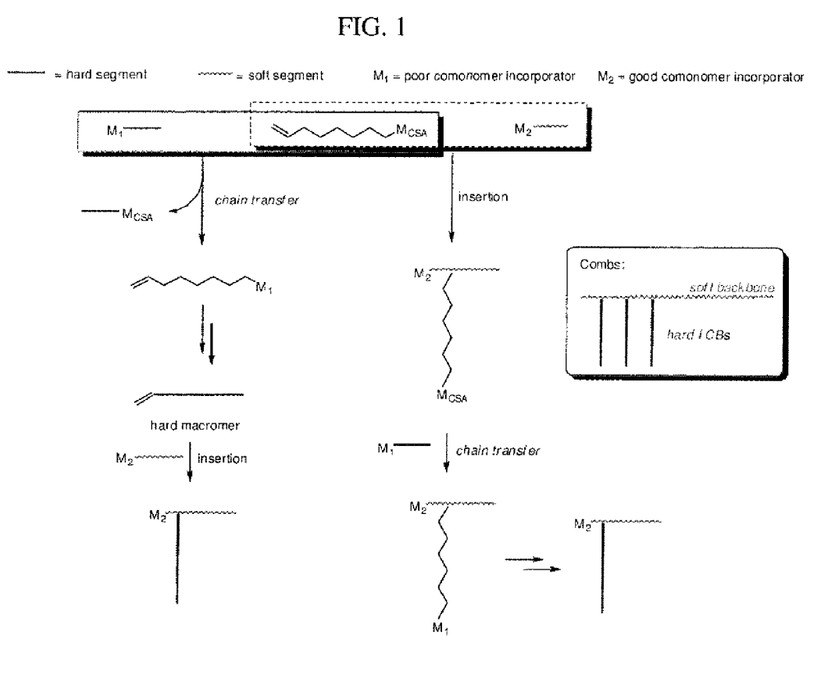
FIG. 1 shows a schematic showing synthesis and architecture of C-OBCs.

The inventive comb olefin block copolymers have an architecture as shown in the schematic of FIG. 1.

The polymers can have rheology ratios greater than 26, preferably greater than 30 and more preferably greater than 33. Preferably the polymers have rheology ratios in the range of from 25.7 to 80, preferably from 30 to 75, most preferably from 33 to 70.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm$^3$ and preferably for ethylene containing polymers from 0.85 g/cm$^3$ to 0.97 g/cm$^3$. In certain embodiments, the density of the ethylene/α-olefin polymers ranges from 0.860 to 0.925 g/cm$^3$ or 0.867 to 0.910 g/cm$^3$.

Additionally, the comb olefin block copolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the C-OBCs have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the C-OBCs is 1 g/10 minutes, 3 g/10 minutes or 5 g/10 minutes.

Applications and End-Uses

The polymers of the invention can be useful employed in a variety of conventional thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or non-woven fabrics. Thermoplastic compositions comprising the present polymers, include blends with other natural or synthetic polymers, additives, reinforcing agents, ignition resistant additives, antioxidants, stabilizers, colorants, extenders, crosslinkers, blowing agents, and plasticizers. Of particular utility are multi-component fibers such as core/sheath fibers, having an outer surface layer, comprising at least in part, one or more polymers of the invention.

Fibers that may be prepared from the present polymers or blends include staple fibers, tow, multicomponent, sheath/core, twisted, and monofilament. Suitable fiber forming processes include spunbonded, melt blown techniques, as disclosed in U.S. Pat. Nos. 4,430,563, 4,663,220, 4,668,566, and 4,322,027, gel spun fibers as disclosed in U.S. Pat. No. 4,413,110, woven and nonwoven fabrics, as disclosed in U.S. Pat. No. 3,485,706, or structures made from such fibers, including blends with other fibers, such as polyester, nylon or cotton, thermoformed articles, extruded shapes, including profile extrusions and co-extrusions, calendared articles, and drawn, twisted, or crimped yarns or fibers. The new polymers described herein are also useful for wire and cable coating operations, as well as in sheet extrusion for vacuum forming operations, and forming molded articles, including the use of injection molding, blow molding process, or rotomolding processes. Compositions comprising the olefin polymers can also be formed into fabricated articles such as those previously mentioned using conventional polyolefin processing techniques which are well known to those skilled in the art of polyolefin processing.

Dispersions (both aqueous and non-aqueous) can also be formed using the present polymers or formulations comprising the same. Frothed foams comprising the invented polymers can also be formed, as disclosed in PCT application No. 2004/027593, filed Aug. 25, 2004. The polymers may also be crosslinked by any known means, such as the use of peroxide, electron beam, silane, azide, or other cross-linking technique. The polymers can also be chemically modified, such as by grafting (for example by use of maleic anhydride (MAH), silanes, or other grafting agent), halogenation, amination, sulfonation, or other chemical modification.

Additives and adjuvants may be included in any formulation comprising the present polymers. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers according to the invention.

Suitable polymers for blending with the polymers of the invention include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene, including high pressure, free-radical LDPE, Ziegler-Natta (heterogeneous) LLDPE, metallocene (homogeneous) PE, including multiple reactor PE ("in reactor" blends of Ziegler-Natta (heterogeneous) PE and metallocene (homogeneous) PE, such as products disclosed in U.S. Pat. Nos. 6,545,088, 6,538,070, 6,566,446, 5,844,045, 5,869,575, and 6,448,341, ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers such as olefin plastomers and elastomers, ethylene-based (for example polymers available under the trade designation AFFINITY™ or ENGAGE™ available from The Dow Chemical Company) and propylene-based copolymers (for example polymers available under the trade designation VERSIFY™ available from The Dow Chemical Company and VISTAMAXX™ available from ExxonMobil can also be useful as components in blends comprising the present polymers.

Suitable end uses for the foregoing products include elastic films and fibers; soft touch goods, such as tooth brush handles and appliance handles; gaskets and profiles; adhesives (including hot melt adhesives and pressure sensitive adhesives); footwear (including shoe soles and shoe liners); auto interior parts and profiles; foam goods (both open and closed cell); impact modifiers for other thermoplastic polymers such as high density polyethylene, isotactic polypropylene, or other olefin polymers; coated fabrics; hoses; tubing; weather stripping; cap liners; flooring; and viscosity index modifiers, also known as pour point modifiers, for lubricants.

In a highly desired embodiment of the invention thermoplastic compositions comprising a thermoplastic matrix polymer, especially isotactic polypropylene, and an elastomeric multi-block copolymer of ethylene and a copolymerizable comonomer according to the invention, are uniquely capable of forming core-shell type particles having hard crystalline or semi-crystalline blocks in the form of a core surrounded by soft or elastomeric blocks forming a "shell" around the occluded domains of hard polymer. These particles are formed and dispersed within the matrix polymer by the forces incurred during melt compounding or blending. This highly desirable morphology is believed to result due to the unique physical properties of the multi-block copolymers which enable compatible polymer regions such as the matrix and higher comonomer content elastomeric regions of the multi-block copolymer to self-assemble in the melt due to thermodynamic forces. Shearing forces during compounding are believed to produce separated regions of matrix polymer encircled by elastomer. Upon solidifying, these regions become occluded elastomer particles encased in the polymer matrix.

Particularly desirable blends are thermoplastic polyolefin blends (TPO), thermoplastic elastomer blends (TPE), thermoplastic vulcanizates (TPV) and styrenic polymer blends. TPE and TPV blends may be prepared by combining the invented comb multi-block polymers, including functionalized or unsaturated derivatives thereof with an optional rubber, including conventional block copolymers, especially an SBS block copolymer, and optionally a crosslinking or vulcanizing agent. TPO blends are generally prepared by blending the invented multi-block copolymers with a polyolefin, and optionally a crosslinking or vulcanizing agent. The foregoing blends may be used in forming a molded object, and optionally crosslinking the resulting molded article. A similar procedure using different components has been previously disclosed in U.S. Pat. No. 6,797,779.

Suitable conventional block copolymers for this application desirably possess a Mooney viscosity (ML 1+4 @ 100° C.) in the range from 10 to 135, more preferably from 25 to 100, and most preferably from 30 to 80. Suitable polyolefins especially include linear or low density polyethylene, polypropylene (including atactic, isotactic, syndiotactic and impact modified versions thereof) and poly(4-methyl-1-pentene). Suitable styrenic polymers include polystyrene, rubber modified polystyrene (HIPS), styrene/acrylonitrile copolymers (SAN), rubber modified SAN (ABS or AES) and styrene maleic anhydride copolymers.

The blends may be prepared by mixing or kneading the respective components at a temperature around or above the melt point temperature of one or both of the components. For most multiblock copolymers, this temperature may be above 130° C., most generally above 145° C., and most preferably above 150° C. Typical polymer mixing or kneading equipment that is capable of reaching the desired temperatures and melt plasticating the mixture may be employed. These include mills, kneaders, extruders (both single screw and twin-screw), Banbury mixers, calendars, and the like. The sequence of mixing and method may depend on the final composition. A combination of Banbury batch mixers and continuous mixers may also be employed, such as a Banbury mixer followed by a mill mixer followed by an extruder. Typically, a TPE or TPV composition will have a higher loading of cross-linkable polymer (typically the conventional block copolymer containing unsaturation) compared to TPO compositions. Generally, for TPE and TPV compositions, the weight ratio of block copolymer to multi-block copolymer maybe from about 90:10 to 10:90, more preferably from 80:20 to 20:80, and most preferably from 75:25 to 25:75. For TPO applications, the weight ratio of multi-block copolymer to polyolefin may be from about 49:51 to about 5:95, more preferably from 35:65 to about 10:90. For modified styrenic polymer applications, the weight ratio of multi-block copolymer to polyolefin may also be from about 49:51 to about 5:95, more preferably from 35:65 to about 10:90. The ratios may be changed by changing the viscosity ratios of the various components. There is considerable literature illustrating techniques for changing the phase continuity by changing the viscosity ratios of the constituents of a blend and a person skilled in this art may consult if necessary.

The blend compositions may contain processing oils, plasticizers, and processing aids. Rubber processing oils have a certain ASTM designation and paraffinic, napthenic or aromatic process oils are all suitable for use. Generally from 0 to 150 parts, more preferably 0 to 100 parts, and most preferably from 0 to 50 parts of oil per 100 parts of total polymer are employed. Higher amounts of oil may tend to improve the processing of the resulting product at the expense of some physical properties. Additional processing aids include conventional waxes, fatty acid salts, such as calcium stearate or zinc stearate, (poly)alcohols including glycols, (poly)alcohol ethers, including glycol ethers, (poly)esters, including (poly) glycol esters, and metal salt-, especially Group 1 or 2 metal or zinc-, salt derivatives thereof.

It is known that non-hydrogenated rubbers such as those comprising polymerized forms of butadiene or isoprene, including block copolymers (here-in-after diene rubbers), have lower resistance to UV, ozone, and oxidation, compared to mostly or highly saturated rubbers. In applications such as tires made from compositions containing higher concentrations of diene based rubbers, it is known to incorporate carbon black to improve rubber stability, along with anti-ozone additives and anti-oxidants. Comb multi-block copolymers according to the present invention possessing extremely low levels of unsaturation, find particular application as a protective surface layer (coated, coextruded or laminated) or weather resistant film adhered to articles formed from conventional diene elastomer modified polymeric compositions.

Testing Methods

GPC Method

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 mL/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene} = 0.431(M_{polystyrene})$.

Polyethylene equivalent molecular weight calculations are performed using Viscotek TriSEC software Version 3.0.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method

Differential Scanning calorimetry results are determined using a TAI model Q1000 DSC equipped with an RCS cooling accessory and an autosampler. A nitrogen purge gas flow of 50 mL/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Density

Samples for density measurement are prepared according to ASTM D 1928. Measurements are made within one hour of sample pressing using ASTM D792, Method B.

Melt Index

Melt index, or $I_2$, is measured in accordance with ASTM D 1238, Condition 190° C./2.16 kg. Melt index, or $I_{10}$ is also measured in accordance with ASTM D 1238, Condition 190° C./10 kg.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

Melt Rheology Method

Small angle oscillatory shear (melt DMS) were performed using a TA Instruments ARES equipped with 25 mm parallel plates under a nitrogen purge. The time between sample loading and beginning of the test was set to 5 min for all samples. The experiments were performed at 190° C. over a frequency range of 0.1 to 100 rad/s. The strain amplitude was adjusted based upon the response of the samples between 1 and 3%. The stress response was analyzed in terms of amplitude and phase, from which the storage modulus (G'), loss modulus (G"), dynamic viscosity $\eta^*$ and tan($\delta$) were calculated.

EXAMPLES

Catalysts

Catalyst 1 is [2',2'''-(((1R,2R)-cyclohexane-1,2-diylbis(methylene))bis(oxy))bis(3-(9H-carbazol-9-yl)-5-methyl-[1,1'-biphenyl]-2-ol)]zirconium dimethyl,

Catalyst 2 is bis-(1-(2-methylcyclohexyl)ethyl)(2-oxoyl-3,5-di(t-butyl)phenyl)immino)zirconium dimethyl Catalyst 3 is [N-(2,6-di(1-methylethyl)phenyl)amido)(2-isopropylphenyl)(α-naphthalen-2-diyl(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

Catalyst 3 is a good shuttler and good incorporator and was used for some comparative examples.
CSAs
DEZ—diethylzinc DOTNZ
(bis(7-octenyl)zinc)

Synthesis of bis(7-octenyl)zinc by borane-mediated hydrozincation

In a glovebox under a dry nitrogen atmosphere, triethylborane (0.62 g, 6.3 mmol) was weighed into a small glass vial with a PTFE-coated stirbar and a PTFE-lined cap. Borane-dimethylsulfide complex (0.30 mL, 3.2 mmol) was added dropwise directly to the stirring liquid. The solution was stirred for 90 minutes at ambient temperature. To a separate glass jar was added 1,7-octadiene (5.7 mL, 38 mmol) and cooled to −40° C. The borane mixture was added slowly to the 1,7-octadiene. The resulting solution was stirred overnight at ambient temperature. The colorless liquid was placed under reduced pressure until approximately 1.4 g of liquid remained. The liquid was cooled to −40° C. Diethylzinc (2.3 g, 19 mmol) was weighed into a separate vial and cooled to −40° C. The 2 vials were removed from the freezer and diethylzinc was added slowly to the colorless liquid. After about 30 minutes, solids had not formed, but the solution became black colored. The solution was stirred overnight at ambient temperature. The volatiles were removed under reduced pressure. When approximately 1 mL remained, the colorless solution was isolated by filtration through a disposable 0.45 micron PTFE syringe frit. The colorless liquid product was placed under reduced pressure for several hours. Total yield: 0.55 g, 20%. $^1$H and $^{13}$C NMR spectra were recorded in toluene-d$_8$. Approximately 8 mol % of the solution was diethylzinc.
Co-Catalysts In all of the following examples and counter examples the co-catalyst used was bis(hydrogenated tallow alkyl)methyl ammonium tetrakis(pentafluorophenyl)borate.

Comparative Examples C1-C2 and Examples 3-5

Small scale continuous solution polymerizations are carried out in a computer controlled autoclave reactor equipped with an internal stirrer and a single baffle. Purified mixed alkanes solvent (Isopar™ E available from ExxonMobil, Inc.), ethylene at 0.0856 lbs/hour (0.0388 kg/hour), 1- and octene are supplied to a 0.10 L reactor equipped with a jacket for temperature control and an internal thermocouple. All liquid components, solvent, 1-octene, catalysts, co-catalyst, and chain shuttling agents are fed into the reactor with syringe pumps. A mass flow controller is used to deliver ethylene to the reactor. The feed streams are introduced into the bottom of the reactor via two dip tubes. The reactor is run liquid-full at 450 psig (3.1 MPa) with vigorous stirring while the product is removed through an exit line at the top of the reactor. The exit line from the reactor is electrically heat traced and insulated. Polymerization is stopped by the addition of a small amount of water and propanol into the exit line along with stabilizers and additives. Polymer samples are collected in open pans and dried in a temperature ramped vacuum oven for approximately 10 hours with a final high temperature set point of 140-150° C. Process data for each run are given in Tables 1-2. Product data for the polymers produced are summarized in Tables 3-4.

Example 6 and Comparative Examples C3-C8

Continuous solution polymerizations is carried out in a computer controlled autoclave reactor equipped with an internal stirrer. Purified mixed alkanes solvent (Isopar™ E available from ExxonMobil, Inc.), ethylene, 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process data for each run are given in Tables 1-2. Product data for the polymers produced are summarized in Tables 3-4.

Comparative Products C9-C11

C9-C11 are INFUSE™ 9000, 9500, and 9100 olefin block copolymers, respectively, and are commercially available from The Dow Chemical Co. Select product data for the polymers are summarized in Tables 3-4.

TABLE 1

Process data.

| Ex. | $C_2H_4$ kg/hr | $C_8H_{16}$ kg/hr | Solv. kg/hr | $H_2$ sccm | T °C. | Catalyst 1 ppm | Catalyst 1 Flow kg/hr | Catalyst 3 ppm | Catalyst 3 Flow kg/hr | Catalyst 2 ppm | Catalyst 2 Flow kg/hr |
|---|---|---|---|---|---|---|---|---|---|---|---|
| C1 | 0.0388 | 0.0621 | 0.450 | 0 | 120 | 84 | 0.0077 | | | 21 | 0.008 |
| C2 | 0.0388 | 0.0621 | 0.450 | 0 | 120 | 84 | 0.0078 | | | 21 | 0.008 |
| C3 | 0.9299 | 1.5331 | 10.89 | 2 | 120 | | | 55 | 0.0998 | 0.25 | 41.28 |
| C4 | 0.9344 | 1.5422 | 10.43 | 7 | 120 | | | 55 | 0.1905 | 0.17 | 41.28 |
| C5 | 1.2882 | 1.9187 | 10.89 | 36 | 120 | | | 197 | 0.1542 | 0.19 | 41.28 |
| C6 | 1.0523 | 2.6989 | 10.43 | 15 | 120 | | | 108 | 0.1361 | 0.24 | 41.28 |
| C7 | 0.9389 | 1.5331 | 10.43 | 5 | 120 | | | 55 | 0.1950 | 0.22 | 41.28 |
| C8 | 1.0795 | 0.9979 | 10.89 | 21 | 120 | | | 55 | 0.1270 | 0.22 | 41.28 |
| 3 | 0.0388 | 0.0621 | 0.450 | 0 | 120 | 211 | 0.0038 | | | 211 | 0.017 |
| 4 | 0.0388 | 0.0621 | 0.450 | 0 | 120 | 211 | 0.0058 | | | 211 | 0.018 |
| 5 | 0.0311 | 0.0497 | 0.454 | 0 | 120 | 211 | 0.0046 | | | 422 | 0.010 |
| 6 | 1.37 | 2.16 | 22.84 | 4 | 125 | 6.89 | 0.1400 | | | 86.9 | 13.5 |

TABLE 2

Process data (continued).

| Ex. | CSA | CSA Conc ppm | CSA Flow kg/hr | Cocat Conc. ppm | Cocat Flow kg/hr | [CSA]/[$C_2H_4$] * 1000 | Poly Rate kg/hr | Conv % | Solids % | Eff. kg/g |
|---|---|---|---|---|---|---|---|---|---|---|
| C1 | DEZ | 1839 | 0.0094 | 2052 | 0.0063 | 2.1 | 0.065 | 91 | 11.7 | 80.0 |
| C2 | DEZ | 1839 | 0.0081 | 2052 | 0.0064 | 1.8 | 0.065 | 91 | 11.7 | 78.9 |
| C3 | DEZ | 1160 | 0.1043 | 521 | 0.1043 | 0.4 | 1.270 | 87 | 9.3 | 210 |
| C4 | DOTNZ | 1171 | 0.0998 | 521 | 0.2132 | 0.4 | 1.229 | 86 | 9.0 | 100 |
| C5 | DOTNZ | 3911 | 0.1361 | 3639 | 0.1043 | 1.8 | 1.860 | 90 | 12.8 | 50 |
| C6 | DOTNZ | 1462 | 0.2268 | 1992 | 0.0998 | 1.5 | 2.041 | 91 | 13.7 | 120 |
| C7 | DOTNZ | 1171 | 0.0998 | 521 | 0.2313 | 0.4 | 1.238 | 87 | 9.1 | 100 |
| C8 | DOTNZ | 1171 | 0.0998 | 521 | 0.1315 | 0.4 | 1.243 | 88 | 9.1 | 160 |
| 3 | DOTNZ | 147 | 0.0619 | 4105 | 0.0174 | 1.2 | 0.065 | 91 | 11.7 | 17.8 |
| 4 | DOTNZ | 147 | 0.0619 | 4105 | 0.0195 | 1.4 | 0.070 | 92 | 12.5 | 18.5 |
| 5 | DOTNZ | 589 | 0.0495 | 8210 | 0.0104 | 4.6 | 0.054 | 91 | 10.1 | 6.2 |
| 6 | DOTNZ | 3243 | 0.0910 | 1200 | 0.23 | 0.66 | 1.3 | 86 | 5.4 | 100 |

TABLE 3

Product data.

| Run | CSA | Density (g/cc) | $I_2$ (dg/min) | $I_{10}/I_2$ | Mw (g/mol) | Mw/Mn | Zn (ppm) | Tm (°C.) | ΔHf (J/g) | Cryst. (%) |
|---|---|---|---|---|---|---|---|---|---|---|
| C1 | DEZ | 0.878 | 1.18 | 14 | 118,250 | 3.15 | 266 | 122 | 66 | 35 |
| C2 | DEZ | 0.876 | 0.82 | 16 | 133,570 | 2.97 | 230 | 122 | 61 | 32 |
| C3 | DEZ | 0.870 | 0.15 | 8.0 | 147,790 | 2.40 | 136 | — | — | — |
| C4 | DOTNZ | 0.871 | 0.18 | 11.2 | 156,050 | 2.40 | 127 | — | — | — |
| C5 | DOTNZ | 0.880 | 1.90 | 10.1 | 164,600 | 2.31 | 288 | — | — | — |
| C6 | DOTNZ | 0.871 | 0.69 | 12.0 | 128,080 | 2.62 | 214 | — | — | — |
| C7 | DOTNZ | 0.877 | 0.11 | 12.0 | 169,090 | 2.45 | 138 | — | — | — |
| C8 | DOTNZ | 0.889 | 0.25 | 10.0 | 127,140 | 2.47 | 124 | — | — | — |
| C9 | | 0.877 | 0.56 | 8.78 | 131,300 | 3.20 | 146 | | | |
| C10 | | 0.878 | 5.37 | 7.44 | 82,600 | 2.30 | 184 | | | |
| C11 | | 0.877 | 0.94 | 8.31 | 123800 | 3.96 | 150 | | | |
| 3 | DOTNZ | 0.896 | 0.81 | 24.0 | 139,290 | 3.39 | 140 | 118 | 58 | 30 |
| 4 | DOTNZ | 0.887 | 1.04 | 36.0 | 154,100 | 3.78 | 131 | 118 | 60 | 32 |

TABLE 3-continued

Product data.

| Run | CSA | Density (g/cc) | $I_2$ (dg/min) | $I_{10}/I_2$ | Mw (g/mol) | Mw/Mn | Zn (ppm) | Tm (° C.) | ΔHf (J/g) | Cryst. (%) |
|---|---|---|---|---|---|---|---|---|---|---|
| 5 | DOTNZ | 0.887 | 1.02 | 19.0 | 106,600 | 3.89 | 535 | 118 | 44 | 23 |
| 6 | DOTNZ | 0.876 | 0.26 | 19.0 | 131890 | 3.16 | 227 | 123 | 63 | 22 |

TABLE 4

Product data.

| Run | TREF peak 1 (° C.) | Fraction (%) | TREF peak 2 (° C.) | Fraction (%) | Solubles (%) | Eta (V0.1) (Pa s) | Eta (V1) (Pa s) | Rheology ratio (V0.1) |
|---|---|---|---|---|---|---|---|---|
| C1 | 94.7 | 72.7 | — | — | 26.9 | 12878 | 6248 | 2.06 |
| C2 | 94.7 | 70.7 | — | — | 29.1 | 18598 | 8177 | 2.27 |
| C3 | — | — | — | — | — | 44900 | 2970 | 15.1 |
| C4 | — | — | — | — | — | 44500 | 2220 | 20.0 |
| C5 | — | — | — | — | — | 5820 | 844 | 6.89 |
| C6 | — | — | — | — | — | 17170 | 1196 | 14.4 |
| C7 | — | — | — | — | — | 68340 | 2666 | 25.6 |
| C8 | — | — | — | — | — | 35440 | 2312 | 15.3 |
| C9 | | | | | | 16600 | 1800 | 9.22 |
| C10 | | | | | | 1520 | 650 | 2.32 |
| C11 | | | | | | 9520 | 1230 | 7.72 |
| 3 | 90.6 | 71.7 | — | — | 28.3 | — | — | — |
| 4 | 91.0 | 66.0 | — | — | 34.0 | 46830 | 761.1 | 61.53 |
| 5 | 87.1 | 87.5 | — | — | 12.5 | 23726 | 517.0 | 45.90 |
| 6 | 96.1 | 21.4 | 89.6 | 34.5 | 44.1 | 42940 | 1271 | 33.8 |

Inventive polymers 4-6 prepared using catalyst 1 (a good incorporating, poor shuttling catalyst), catalyst 2 (a poor incorporating, good shuttling catalyst) and DOTNZ (a shuttling agent with vinyl unsaturation) show unexpectedly high rheology ratios and relatively narrow MWDs (<4). Samples prepared with the same catalyst mixture (catalyst 1 and catalyst 2) and DEZ (a shuttling agent without vinyl unsaturation) did not show these high rheology ratios (C1-C2). Polymers C3-C8 prepared with catalyst 3 (a good incorporating, good shuttling catalyst), catalyst 2 (a poor incorporating, good shuttling catalyst) and DOTNZ (a shuttling agent with vinyl unsaturation) did not show unexpectedly high rheology ratios, although they were higher than those measured for C9-C11, which are OBCs with little long chain branching.

Figure 2:
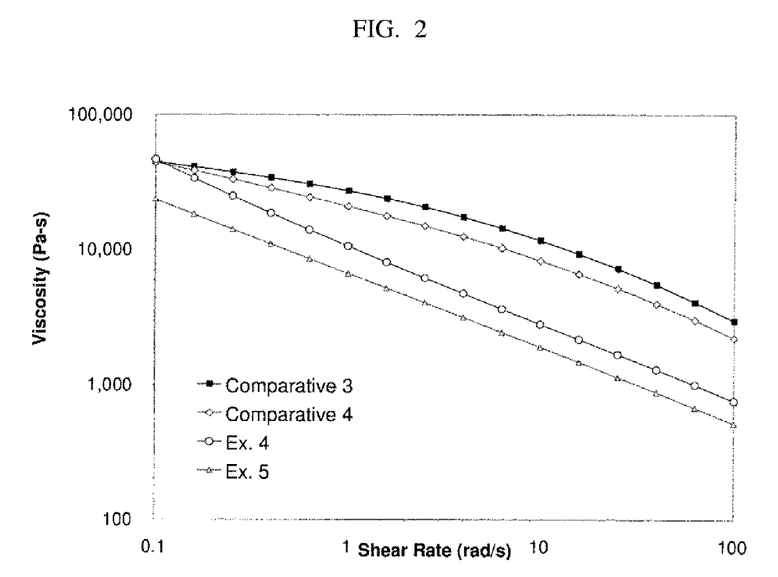
FIG. 2 shows a comparison of melt rheology of C-OBCs with two comparative OBCs.

FIG. 2 shows a comparison of the melt rheology of Examples 4 and 5 with that of Comparatives 3 and 4. These results demonstrate that the Example polymers have significantly more sheer thinning than the Comparatives. Catalyst 1 (good incorporator and poor shuttler) was used for Examples 4 and 5 as compared to catalyst 3 (good incorporator and good shuttler) for Comparative 3 and 4.

Figure 3:
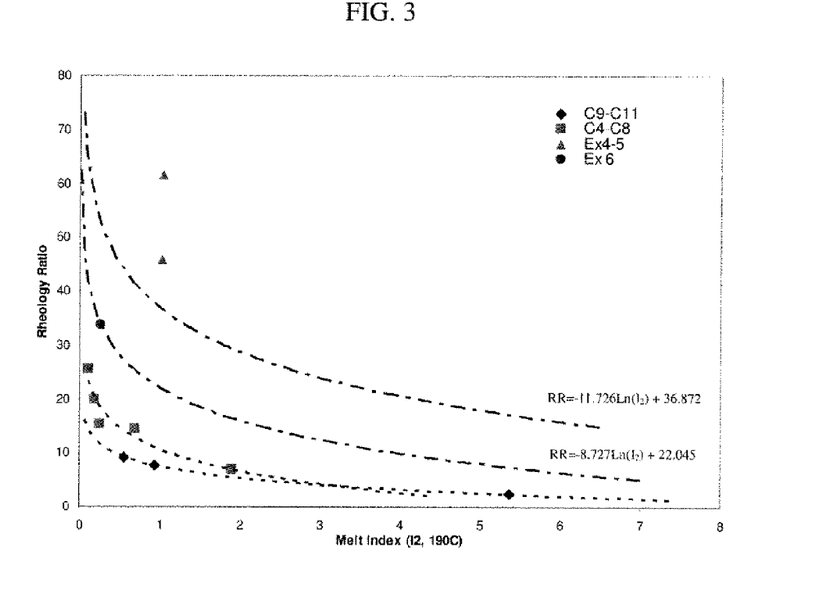
FIG. 3 shows rheology ratio as a function of melt index for comparative OBCs and C-OBCs.

As shown in FIG. 3, rheology ratio is a function of melt index. Examples 3-6 show unexpectedly high rheology ratio at a given melt index. It is believed that this is due to their cleaner comb structure. Example 6 is made with a small amount of hydrogen that results in formation of hard segment rich material that is not present in Examples 3-5.

In one embodiment of the invention the polyolefin compositions have a rheology ratio (RR) as a function of melt index $(I_2)$ according to the following relationship:

$$RR \geq -11.726 \, Ln(I_2) + 36.872$$

In another embodiment of the invention the polyolefin compositions have a rheology ratio (RR) as a function of melt index $(I_2)$ according to the following relationship:

$$RR \geq -8.727 \, Ln(I_2) + 22.045$$

In yet another embodiment of the invention the olefin block copolymer (OBC) compositions have a rheology ratio (RR) as a function of melt index $(I_2)$ according to the following relationship:

$$RR \geq -11.726 \, Ln(I_2) + 36.872$$

In yet another embodiment of the invention the olefin block copolymer (OBC) compositions have a rheology ratio (RR) as a function of melt index $(I_2)$ according to the following relationship:

$$RR \geq -8.727 \, Ln(I_2) + 22.045$$

Figure 4:
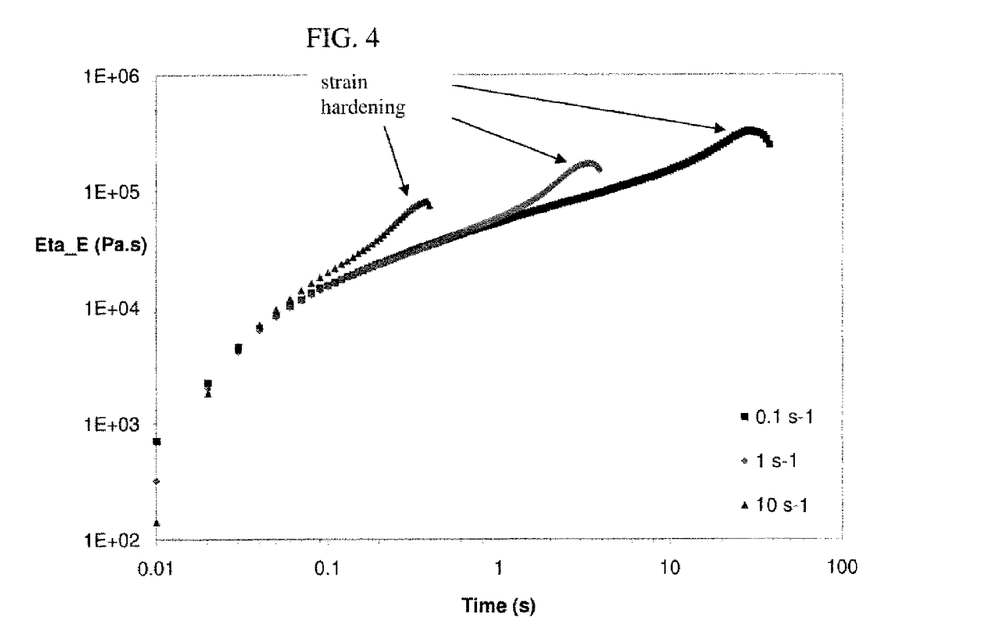
FIG. 4 shows extensional viscosity as a function of time at different strain rates for Example 6.

The strain-hardening shown in the extensional viscosity traces for Ex. 6 in FIG. 4 indicates that the sample has multiple branches, i.e. a comb-like structure. A single long-chain branch typically produces a lower extent of strain hardening. The dependence of strain hardening as a function of strain rate is also different, as single-branched chains normally show no or very low strain hardening at high strain rates and relatively strong strain hardening at low strain rates. In the curves for Ex. 6, the extent of strain hardening is similar across the measured strain rate range, indicating that the branches are across the whole MW range and not only in the high MW portion.

The invention claimed is:

1. A comb olefin block copolymer comprising a soft copolymer backbone and hard or crystalline side chains, wherein:
   the soft copolymer comprises ethylene and an α-olefin, and has an α-olefin content greater than 5 wt % to 90 wt %, based on the weight of the polymer,
   the hard or crystalline side chains comprise ethylene in an amount greater than 95 wt %, and
   the olefin copolymer has a rheology ratio in the range of from 25.7 to 80.

2. The comb olefin block copolymer of claim 1 having a melt index, $I_2$, of from 0.01 to 2000 g/10 min.

3. The comb olefin block copolymer of claim 1 having side chains present in an amount of from 5 wt % to 50 wt %, based on the weight of the polymer.

4. The comb olefin block copolymer of claim 1 wherein the rheology ratio is from 33 to 70.

5. The comb olefin block copolymer of claim 1 wherein the rheology ratio (RR) as a function of melt index ($I_2$) has the following relationship:

$$RR \geq -11.726 \, \text{Ln}(I_2) + 36.872.$$

* * * * *